United States Patent
Bosse (10) Patent No.: US 7,296,986 B2
(45) Date of Patent: Nov. 20, 2007

(54) INDUCTION COUPLING FOR BRAKING ROLLER DRIVE ON THE FLAT-FOLDING DEVICE

(75) Inventor: Frank Bosse, Tecklenburg (DE)

(73) Assignee: Windmoeller & Hoelscher KG, Lengerich (DE)

( * ) Notice: Subject to any disclaimer, the term of this patent is extended or adjusted under 35 U.S.C. 154(b) by 0 days.

(21) Appl. No.: 10/573,592

(22) PCT Filed: Sep. 22, 2004

(86) PCT No.: PCT/EP2004/010626

§ 371 (c)(1),
(2), (4) Date: Mar. 27, 2006

(87) PCT Pub. No.: WO2005/032798

PCT Pub. Date: Apr. 14, 2005

(65) Prior Publication Data

US 2006/0280828 A1    Dec. 14, 2006

(30) Foreign Application Priority Data

Sep. 27, 2003  (DE) ................. 103 44 984
Apr. 14, 2004  (DE) ................. 10 2004 019 314

(51) Int. Cl.
*B29C 47/90* (2006.01)

(52) U.S. Cl. ............. 425/72.1; 425/66; 425/214; 425/326.12; 425/392

(58) Field of Classification Search ............. 425/66, 425/72.1, 214, 326.1, 387.1, 392
See application file for complete search history.

(56) References Cited

U.S. PATENT DOCUMENTS

| | | | | |
|---|---|---|---|---|
| 3,557,925 A | * | 1/1971 | Zulauf ................. | 193/35 A |
| 3,713,521 A | * | 1/1973 | Moritake ................ | 193/37 |
| 4,170,624 A | * | 10/1979 | Dawson ................. | 264/564 |
| 4,682,941 A | * | 7/1987 | Upmeier et al. .......... | 425/72.1 |
| 5,106,281 A | | 4/1992 | Achelpohl | |
| 5,912,022 A | | 6/1999 | Sensen et al. | |

FOREIGN PATENT DOCUMENTS

| | | |
|---|---|---|
| DE | 101 40 577 A1 | 3/2003 |
| EP | 795 391 A2 | 9/1997 |
| FR | 2 027 853 A | 10/1970 |
| GB | 664 412 A | 1/1952 |
| GB | 1290517 | 9/1972 |
| JP | 03 090332 A | 4/1991 |
| WO | WO 03/016023 | 2/2003 |

OTHER PUBLICATIONS

English translation of WO 03/016023, dated Feb. 2003.*

* cited by examiner

*Primary Examiner*—Robert Davis
*Assistant Examiner*—Joseph Leyson
(74) *Attorney, Agent, or Firm*—Jacobson Holman PLLC (57) ABSTRACT

Equipment that lays flat films or tubular films extruded by a blown film extrusion installation has at least one roller, which guides the walls of the film or the tubular film. The lay-flat equipment has at least one device that influences the rotational speed of the roller by providing a torque that can be transferred onto the roller by a transfer device. The transfer device provides for slippage between the roller and the device that provides the torque, thereby ensuring a smooth transfer of torque and preventing damage to the film.

12 Claims, 7 Drawing Sheets

INDUCTION COUPLING FOR BRAKING ROLLER DRIVE ON THE FLAT-FOLDING DEVICE

This is a nationalization of PCT/EP04/010626 filed 22 Sep. 2004 and published in German.

BACKGROUND OF THE INVENTION

1. Field of the Invention

The invention relates to equipment that lays flat films or tubular films.

2. Description of the Prior Art

Lay-flat equipment of this type is known. The equipment is used especially in extrusion devices, which extrude tubular films with the help of a blown film die. These tubular films are either laid flat completely or are sub-divided previously into films or tubular films and are laid flat subsequently. The lay-flat equipment usually consists of lay-flat plates and/or lay-flat frames placed against one another in a wedge-shaped manner, said plates and/or frames being loaded with surfaces, on which the film to be laid flat and/or the walls of the tubular film slide along. It has been suggested in recent times that rollers be used instead of these surfaces. This is illustrated, for example, in DE 101 40 577 A1 and EP 795 391 A2. The purpose of the use of the rollers is to prevent damages of the freshly extruded films caused by the lay-flat equipments. However, devising measures for further reducing these damages continues to be among the preoccupations of those of skill in the art.

SUMMARY OF THE INVENTION

Therefore the present invention is based on the aforementioned devices and its object is to further prevent the mentioned damages of the film. This object is achieved by the features of the invention described herein. In the words of the present application, torque can be provided both by a motor, thus an actively torque-generating unit as well as by a brake mechanism.

This concept is based on the fact that a brake mechanism provides "negative torque" while a motor provides "positive torque." Positive torque supports the proper movement of the film, negative works against it. Either brakes or motors can be advantageous in case of different films. A design form of the torque transfer devices according to the invention is of great advantage in case of both types of torque transfer devices in the sense of the present invention. Both a brake as well as a motor can bring about damages on the film due to the rigid manner of torque provision that is peculiar to it. Therefore the present invention teaches to provide torque transfer devices, which allow a slip between the roller and the means for providing the torque. Here, a slip is present at least, when the roller rotates at a different speed per unit of time than the driving journals of the means for providing the torque. The torque transfer devices are often advantageously embodied as a coupling. Force-fit connections in the sense of the usual definitions and the present invention are connections, in which the parts which to be connected are held by a force, e.g., a frictional force, in their opposite position. In the case of an exceedance of a certain force and/or in this case a certain torque, a movement of the two connected parts towards each other becomes possible (often the parts to be connected slide toward one another), without irreproducibly destroying the connection in doing so. An example of a force-fit power transmission is friction gears and also friction couplings. Friction usually plays a role even in hydraulic couplings, as a result of which they are usually categorized under the term "frictional force-fit connections." Bringing about or supporting a force-fit connection using a magnet is among the measures, which can be consulted for an advantageous embodiment of the present invention. Here it is immaterial whether the total force for implementing the force-fit connection is provided by the magnet, or whether the magnet presses together, for example, two disks, which on their part, bring about the force-fit connection by their friction. In all types of a force-fit connection, it appears to be advantageous if the force flow surfaces turned towards one another and using which the force-fit connection takes place and using which the torque is finally transferred, are reducible or increasable. Due to this, the amount of the maximum torque transmission can be defined and/or varied. Usually force flow surfaces are the surfaces of plate-shaped coupling pieces, said surfaces being turned towards one another, wherein said coupling pieces pressed together using any force thus create the force fit or friction fit. If several such transfer devices are provided, it appears advantageous to interconnect this multitude of force flow devices so that a relative movement of the force flow surfaces assigned to the torque providing means opposite to the force flow surfaces assigned to the rollers leads to a change in the maximum transferable torque in all transfer devices. Another alternative to change the maximum transferable torque of such a force-fit connection provides a torque transfer device, which implements the force-fit connection with the help of an electromagnet. In case of such an electromagnet, the field intensity can be changed by a variation of the current intensity, with which the electromagnet is controlled. Due to this naturally even the strength of the force-fit connection is changeable. The changeability can play an important role for the film quality especially during order changes or when determining damages, for example using sensors observing the film and is thus markedly advantageous when embodying the present invention.

Additional embodiments of the present invention are based on this description and the claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
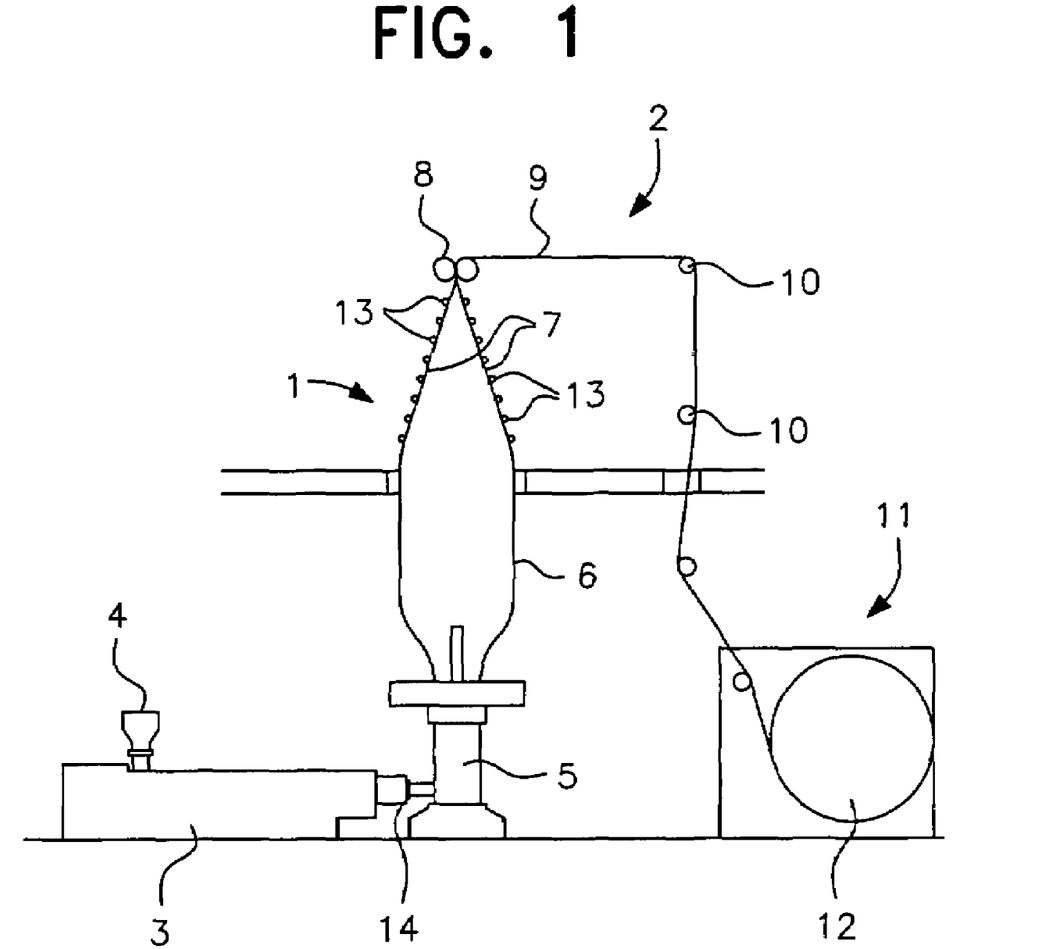
FIG. 1 a sketch of a blown film extrusion installation.

FIG. 1 illustrates a lay-flat equipment 1, which consists of two lay-flat devices 7 placed against one another in a wedge-shaped manner and having rollers 13. The lay-flat equipment 1 is a part of a blown film extrusion installation 2 for the production of tubular films 6.

The flow of material in the blown film extrusion installation starts at the supply funnel 4 of the extruder 3 using which plastic raw material-preferably in granulate form—is supplied to the extruder 3. As is generally known, the extruder 3 transforms the raw material (not illustrated) into a semi fluid form, which is supplied to the blown film die 5 by way of the connecting piece 14.

The blown film die 5 extrudes the tubular film 6, which is laid-flat in the lay-flat equipment 1, which consists of two lay-flat devices 7, placed against one another in a wedge-shaped manner. The squeegee rollers 8 additionally squeeze the laid-flat film 9. The laid-flat film moves over rollers 10 to the winding device 11 and is wound up there on the roll 12.

Blown film extrusion installations of this have been known for a long time and therefore exist in all possible embodiments. Thus it is customary to first supply the laid-flat film 9 after the squeezing process to a so-called oscillating unit in order to improve the winding quality. Such an oscillating unit is not shown in the embodiment illustrated.

Figure 2:
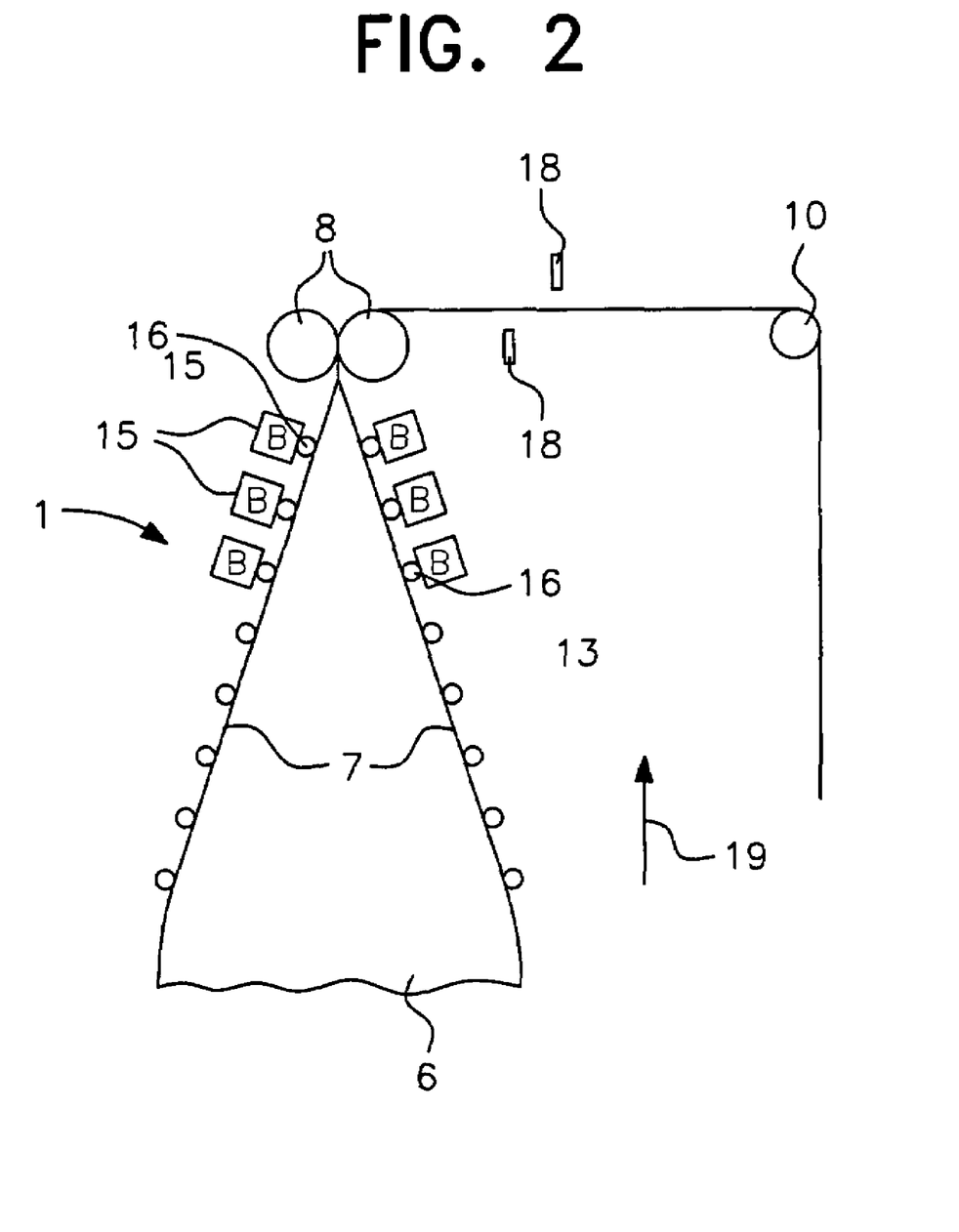
FIG. 2 a sketch of a lay-flat equipment with a brake mechanism for each roller.

FIG. 2 illustrates the lay-flat equipment 1 having two lay-flat devices 7, also called lay-flat plates 7 that are arranged in a wedge-shaped manner relative to one another. The tubular film 6 moves in the feed direction of the film, which is indicated by the arrow 19, though the lay-flat equipment 1 and in doing so slides along the rollers 13. A brake mechanism 15 is assigned to each of the braking rollers 16. FIG. 2 also illustrates two sensors 18, which are held above and below the laid-flat film 9. These sensors examine the film for damages and folds. They are preferably optical sensors. Such sensors can also be arranged between the rollers 16 or roller groups 17. Such arrangements facilitate the assignment of the damages or folds to the rollers causing them.

Figure 3:
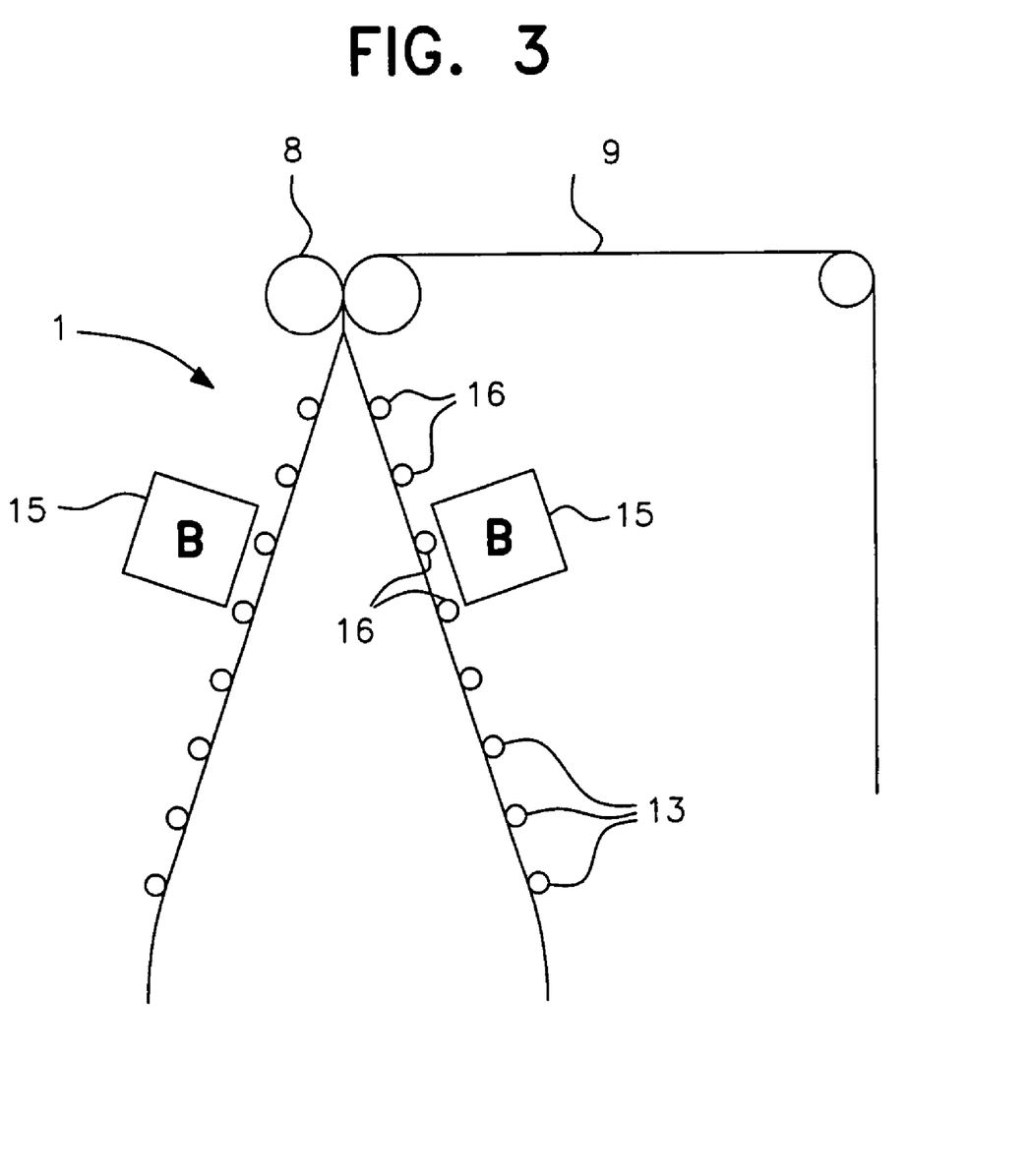
FIG. 3 a sketch of a lay-flat equipment with a brake mechanism for several rollers.

FIG. 3 illustrates a lay-flat equipment 1 having unbraked rollers 13 and braked rollers 16, wherein in this embodiment the braked rollers of a lay-flat device 7 are each braked by a brake mechanism 15. Here the braking force and/or the torque is transferred using belts (not illustrated). The rollers braked by a brake mechanism belong to a group of rollers 17.

In all three figures, the control and regulating devices, control lines, electricity cables and the like were not shown for illustrational reasons.

Figure 4:
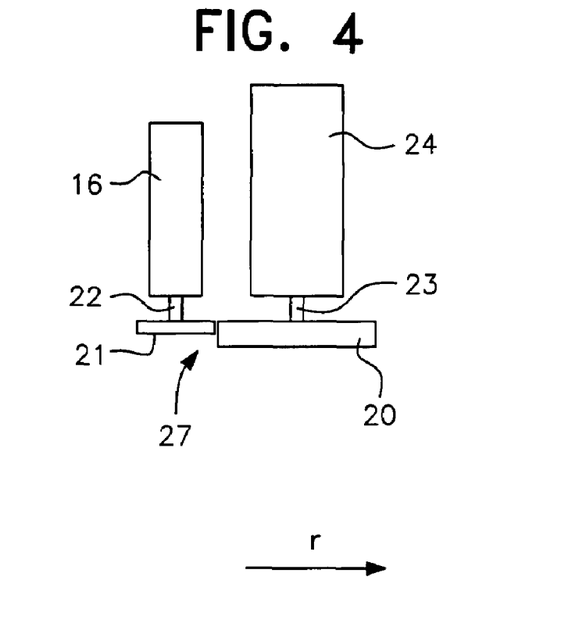
FIG. 4 a sketch of a roller and a torque transfer device, which are loaded with two drive disks arranged radially relative to each other.
Figure 5:
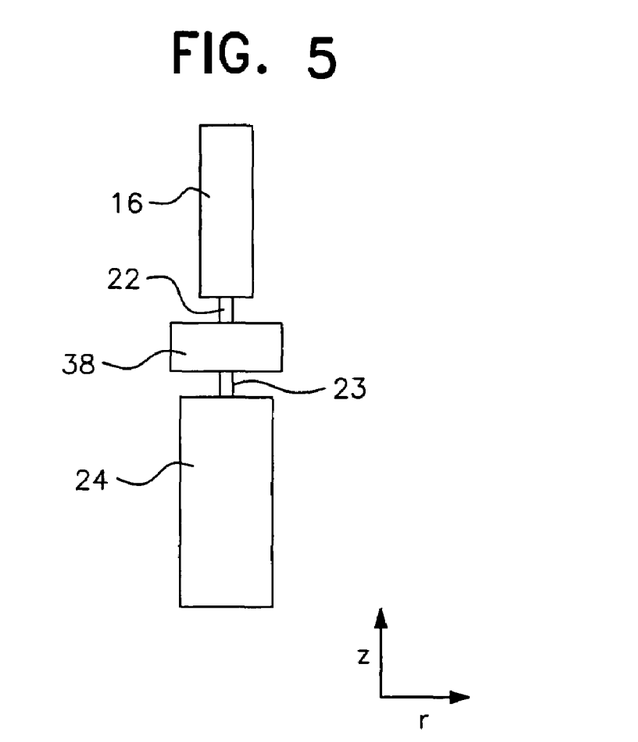
FIG. 5 another sketch comprising a torque transfer device and a roller, which is equipped with a coupling.

FIG. 4 illustrates a sketch of an arrangement of a roller 16 according to the invention and a torque providing means 24 of a lay-flat equipment 1. The roller 16 is provided with a driving journal 22 and the torque providing means 24 are equipped with a driving journal 23. Drive disks 21 and 20 are attached on the driving journals 22 and 23. The peripheral surfaces of both these drive disks 21 and 20 contact one another and in this way define a force-fit connection 27. The peripheral surfaces of both the drive disks are smooth and advantageously processed from an elastic material such as rubber. This arrangement of roller and torque providing means 24 is especially suitable for implementing the arrangements of rollers 16 and torque providing means 24, as illustrated in the FIGS. 2 and 3. An illustration of the additional elements of the lay-flat equipment, as for example, illustrated in the first three figures and as required, for example, in order to hold and/or support the rollers 16 and the torque providing means 24, is omitted here as in case of the FIGS. 5 to 9. FIG. 5 illustrates a sketch of another function pair made of a roller 16 and a torque providing means 24. Here also, the driving journals 22 and 23 can be seen. These driving journals are connected to a coupling 38, which is simply illustrated as a rectangle almost in the form of a blackbox. This coupling can be a customary frictional coupling or it can represent a gear coupling, or even a hydraulic coupling. As specified in the claims, the characteristic of the coupling 38 or of a coupling generally in the sense of the present application is the separability of the torque providing means 24 and the roller 16. It follows from this description that even an equipment according to FIG. 4 or according to the subsequent figures can be implemented as a coupling, if the corresponding drive disks 21 and 20 or force flow disks 25 and 26 in the subsequent figures can be separated. What naturally stands out when comparing FIGS. 4 and 5 is that in FIG. 4 the roller 16 and the torque providing means 24 follow one another in the radial direction r of the roller 16. In FIG. 5 these two elements 16 and 24 are arranged in such a way that they follow one another in the axial direction of the roller 16. The higher installation length in the aforementioned axial direction z of the roller 16 is naturally among the disadvantages of this arrangement. The advantages, as shown in FIGS. 6 to 9, are that it is usually simpler to provide drive disks or force flow disks, which comprise a large force flow surface having a large opposite overlapping surface.

In FIG. 4, the contact surface between both the drive disks 21 and 20 is rather small. As mentioned before, the FIG. 6 also illustrates an arrangement of a roller 16 and a torque providing means 24. The driving journals 22 and 23 of these two elements follow one another in the axial direction z of the roller 16, as illustrated in FIG. 5. They are interconnected by both the force flow disks 25 and 26, which comprise force flow surfaces that are turned towards one another and contact one another and in this way define the force-fit connection 27. The force existing between these two force flow disks can be applied in that the two disks are pressed on top of one another by an external force and a friction arises in this way, which prevents a slipping of the disks against one another during the circular motion till a maximum torque transmission is exceeded. However, it is also possible to provide the forces using suitable measures inside the two force flow disks 26 and 25. Thus it is possible, to equip one or both the disks 25 and 26 with magnets, so that a magnetic attraction results between opposite magnetic poles or between the magnet and the ferromagnetics or in any other manner.

Figure 7:
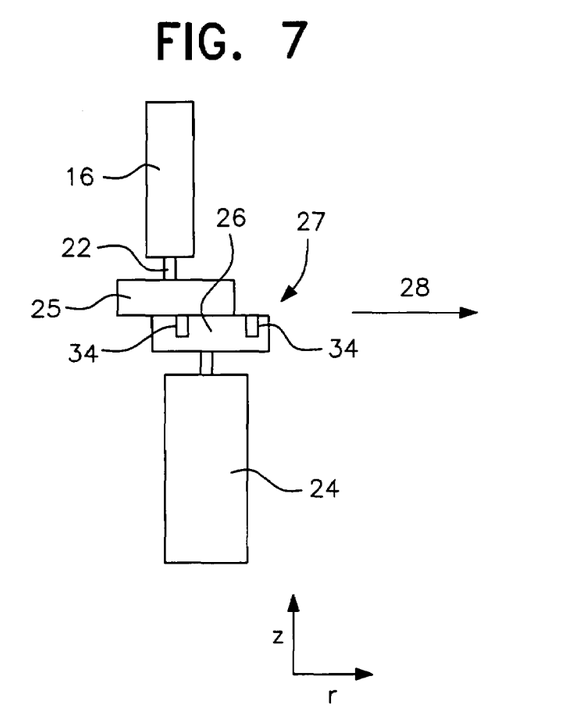
FIG. 7 the arrangement shown in FIG. 6, wherein the force flow disks are moved against each other.

In each of the mentioned cases and in each of the cases in which a force-fit connection takes place between force flow surfaces of the force flow disks 25 and 26, it is possible to change the amount of the maximum torque transmission between both the disks 25 and 26 by carrying out a displacement of the two force flow disks 25 and 26 in the radial direction of the roller 16 and/or of the disks 25 and 26, so that as illustrated in FIG. 7, the contact surface and/or the surface of the opposite overlap of both the force flow disks 25 and 26 is changed and/or reduced, as illustrated. In this connection it must be pointed out that it is not absolutely necessary for the two force flow disks to be in direct contact. Thus, especially in case of the use of magnets, even an additional disk can be affixed or even a gap can exist between both the force flow disks. Inspite of that, the magnetic attractive forces will ensure a certain torque transmission between the two disks. Similar alternatives exist in case of the use of hydraulic couplings and/or force-fit connections, which are created with the help of liquids or similar media between two disks. Such measures are also reproducible for a person of skill in the art against the background of the present invention.

Figure 8:
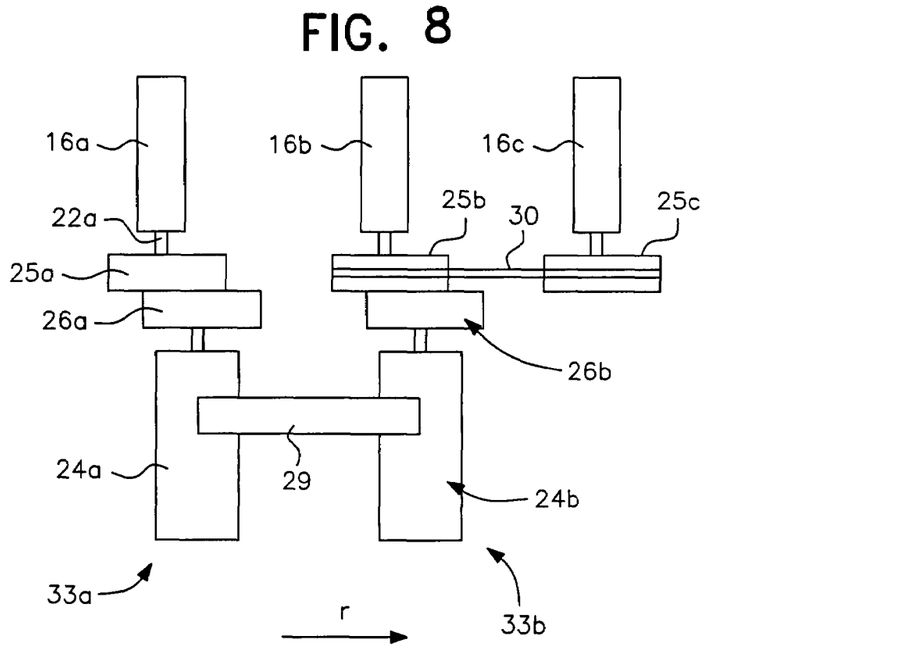
FIG. 8 the arrangement shown in FIG. 7, wherein several pairs of motors and drive disks are shown.

A similar measure for changing the transferred torque, as in FIG. 7, illustrated in FIG. 8. However, FIG. 8 illustrates several function pairs 33a, 33b made of roller 16 and torque providing means 24a and 24b. It is illustrated using the connecting rod 29 that the two torque providing means 24a and 24b are interconnected, so that they can be displaced in common in the radial direction of the rollers 16a, b and c. In this common displacement both the contact surfaces are reduced. Another difference from FIG. 7 is that the force flow disk 25b of the function pair 33b also receives force transferred for the operation of the roller 16c. It passes over this torque using the chain 30 to the drive disk 25c of the roller 16c. Using the measures, as illustrated in FIGS. 7 and 8, it is also possible to change and/or to reduce by different amounts or even at a different proportion the contact surfaces of different drive disk pairs 25a, 26a, 25b, 26b by a suitable geometric design of the relations of the different drive disks 25 and 26 with respect to one another, by a suitable arrangement of the same in a lay-flat equipment and by the determination of a suitable axis of motion for the common movement, in case of a common movement from first drive disks to second drive disks. In this manner, it is possible to variably change the maximum torque to be transferred, which is decisive for the start of a slipping movement. The advantages of such a measure are similar to those of providing a different torque for different rollers.

Figure 6:
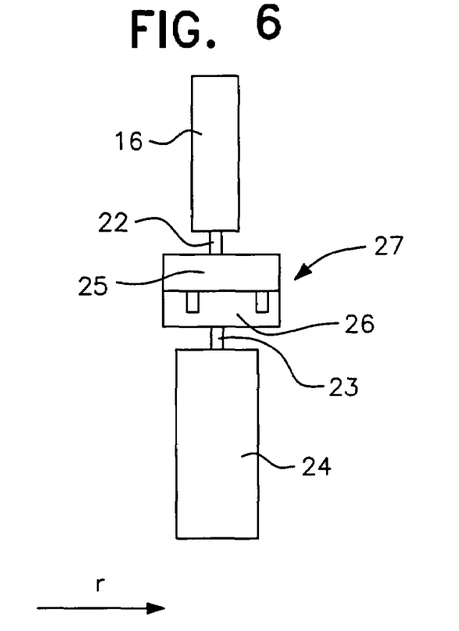
FIG. 6 a sketch of a roller and a torque provision means, which are connected using force flow disks.
Figure 9:
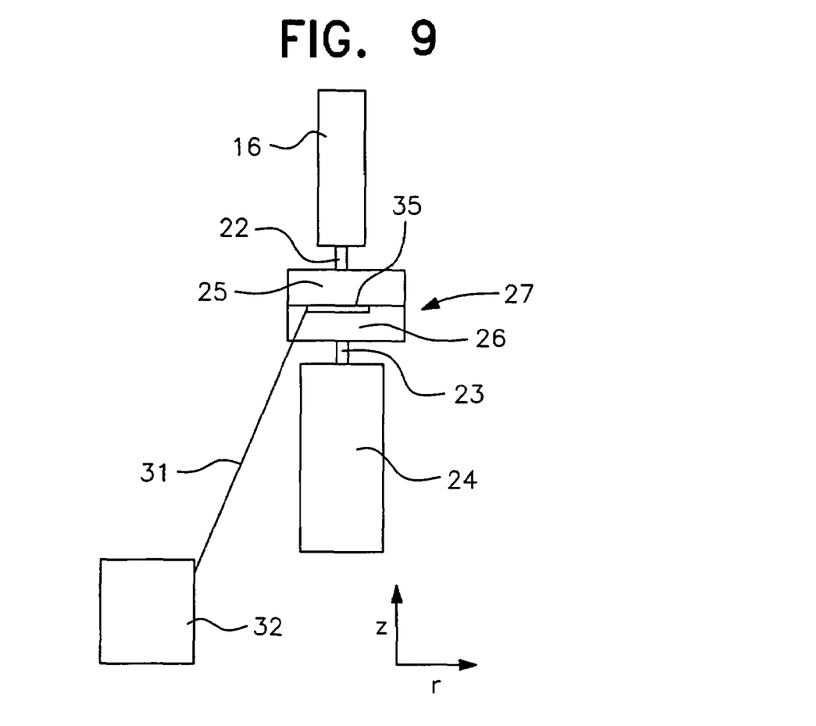
FIG. 9 an arrangement according to the invention of a roller and a torque transfer device comprising an electromagnet and a power controller.

FIG. 9 illustrates again an arrangement, which is very similar to that shown in FIG. 6. However, the power controller 32, which is connected using the connecting cable 31 to the force flow disk 26, is also illustrated in FIG. 9. The illustration of the power controller 32 and the electricity cable 31 is also naturally a sketched illustration. Normally, the electricity cable would have had to be guided using the driving journal 23 to the force flow disk 26 in order to remain operative. However, it should be indicated using the two additionally illustrated characteristics 32 and 31 that an electromagnet 35 is also superbly suitable for changing the maximum torque that can be transferred using the force-fit connection 27. As mentioned already, this change takes place primarily using a changing current intensity with which the coils of the electromagnet 35 are loaded. This change involves a change in the magnetic field. An embodiment of the present invention having an electromagnet 35 can, however, be combined randomly with other embodiments of the invention.

The FIGS. 10 and 11 once again illustrate larger picture details having the force flow disks 25 and 26 and clarify the location of the flow surfaces 36 and 37 relative to one another.

Figure 10:
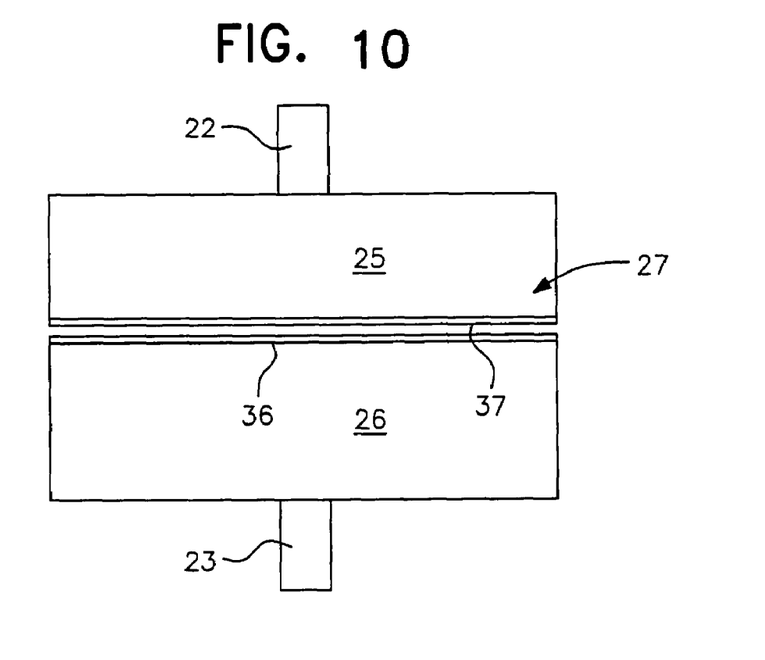
FIG. 10 two force flow disks shown against one another.

FIG. 10 illustrates an arrangement without magnets 34. The interspace between the force flow surfaces 36 and 37 is overstated in FIG. 10. In reality such an arrangement is usually based on the fact that the force flow surfaces 36 and 37 lie on one another and create the friction in this manner. The force required for this purpose can be transferred onto the disks 25 and 26, for example, using the two driving journals 22 and 23. The torque transfer then takes place due to the friction between both the disks. As previously mentioned, it is also possible, in principle, to leave a gap between the force flow surfaces 36 and 37 and to arrange in this gap, for example, a hydraulic liquid, which conveys a frictional force to the force flow surfaces.

Figure 11:
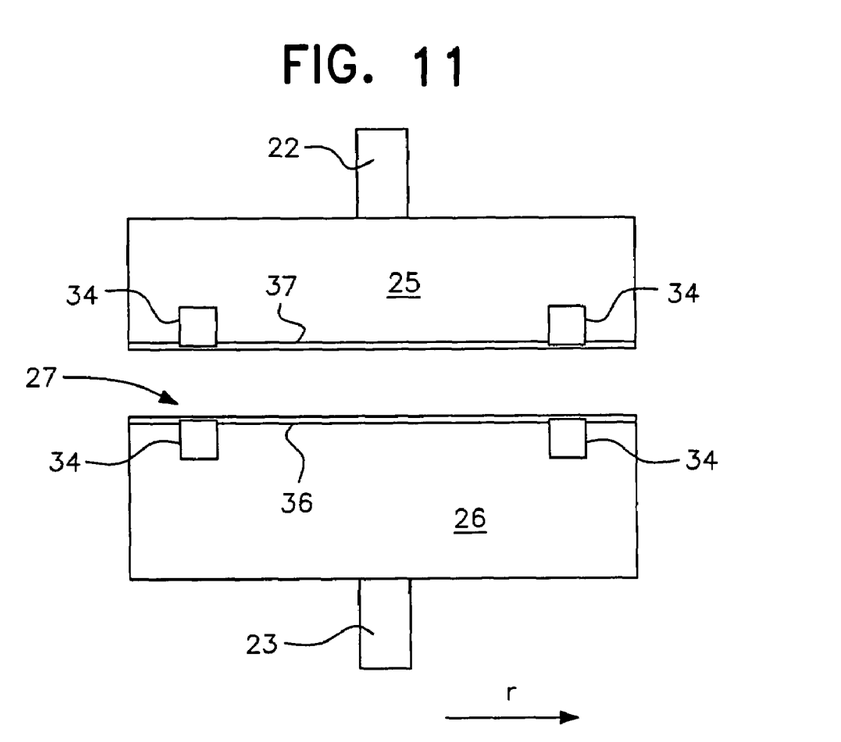
FIG. 11 two force flow disks having magnets.

Another alternative to transfer force over a longer distance is illustrated in FIG. 11. Here magnets 34 are arranged in both the force flow disks 25 and 26. These magnets form function pairs, each of which consists of magnets of the two disks, which are arranged in these two disks in opposition to one another and in a way are arranged in an anti-polar manner relative to one another, which leads to an attraction. It is thus also possible to transfer force by means of a magnetic gap. However, usually when using such magnetic couplings even friction can play a role, that is, the magnets provide the force which presses both the force flow disks 25 and 26 together and in this manner leads to the necessary friction between the force flow surfaces 36 and 37. It can also be easily understood based on FIG. 11 that a displacement of one of the two force flow disks 25 and 26 even by small amounts in the radial direction of the roller r leads to a considerable reduction of the force built-up between the magnets 34 of the two disks 25, 26. Thus the maximum torque transferable by the force flow disk 26 onto the force flow disk 25 is reduced and thus it is ensured that a slipping occurs even at a lesser torque.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List Of Reference Symbols | |
|---|---|
| 1 | Lay-flat equipment |
| 2 | Blown film extrusion installation |
| 3 | Extruder |
| 4 | Supply funnel |
| 5 | Blown film die |
| 6 | Tubular film |
| 7 | Lay-flat device/Lay-flat plates |
| 8 | Squeegee rollers |
| 9 | Laid-flat film and/or laid-flat tubular film |
| 10 | Transport rollers |
| 11 | Winding device |
| 12 | Film roll |
| 13 | Rollers |
| 14 | Connecting piece |
| 15 | Brake mechanism |
| 16 | Rollers |
| 17 | Group of braked rollers |
| 18 | Sensors |
| 19 | Arrow in the conveying direction of the film |
| 20 | Drive disk of 24 |
| 21 | Drive disk of the roller 16 |
| 21c | Drive disk of the roller 16c |
| 22 | Driving journal |
| 23 | Driving journal of 24 |
| 24 | Motor or brake, means for providing a torque |
| 25 | Force flow disk of roller 16 |
| 26 | Force flow disk of roller 24 |
| 27 | Force-fit connection |
| 28 | Arrow in y direction |

-continued

| List Of Reference Symbols | |
|---|---|
| 29 | Connecting rod |
| 30 | Drive chain |
| 31 | Electricity cable |
| 32 | Power controller |
| 33 a, b | Function pair made of 16 + 24 |
| 34 | Magnet |
| 35 | Electromagnet |
| 36 | Force flow surface of 26 |
| 37 | Force flow surface of 25 |
| 38 | |
| 39 | |
| 40 | |
| 41 | |
| 42 | |
| 43 | |
| 44 | |
| 45 | |
| 46 | |
| 47 | |
| 48 | |
| 49 | |
| 50 | |
| 51 | |
| 52 | |
| 53 | |
| 54 | |

What is claimed is:

1. Equipment for laying flat a film or a tubular film extruded by a blown film extrusion installation, the equipment comprising at least one roller that guides walls of the film or of the tubular film, at least one device that influences a rotational speed of the roller by providing a torque that can be transferred onto the roller, and a transfer device that transfers the torque and provides for slippage between the roller and the torque-providing device.

2. The lay-flat equipment according to claim 1, wherein the transfer device includes a coupling configured to provide separation between the roller and the torque-providing device.

3. The lay-flat equipment according to claim 1, wherein the transfer device is configured to transfer the torque with a force-fit connection.

4. The lay-flat equipment according to claim 3, wherein the force-fit connection is a hydraulic coupling or a friction coupling.

5. The lay-flat equipment according to claim 3, wherein the force-fit connection includes at least one magnet.

6. The lay-flat equipment according to claim 3, wherein the roller has a first force flow surface and the torque-providing device has a second force flow surface, said first and second force flow surfaces being turned towards one another so as to define the force-fit connection wherein a surface of the opposite overlap of the first and second force flow surfaces determines an amount of maximum torque transmission and wherein the opposite overlap surface is changed by a relative movement of the first and second force flow surfaces 3.

7. The lay-flat equipment according to claim 1, wherein the equipment includes a plurality of the transfer devices.

8. The lay-flat equipment according to claim 1, wherein the equipment includes a plurality of the rollers and a plurality of the transfer devices, wherein each transfer device has a first force flow surface and a second force flow surface, and wherein a surface of opposite overlap of the first and second force flow surfaces is changed by a relative movement of the first and second force flow surfaces.

9. The lay-flat equipment according to claim 1, wherein the transfer device transfers torque to a plurality of the rollers.

10. The lay-flat equipment according to claim 5, wherein the magnet is an electromagnet connected to a power controller configured to change a current intensity in coils of the electromagnet and thereby change a field intensity generated by the electromagnet.

11. A device for laying flat a film extruded by a blown film extrusion installation, the lay-flat device comprising at least one roller that conveys the film, at least one device that applies a torque that can be transferred to the roller so as to influence a rotational speed thereof, and a transfer device that transfers the applied torque and provides for controlled gradual engagement between the roller and the torque-providing device.

12. The lay-flat device according to claim 11, wherein the transfer device is configured to transfer the torque with a force-fit connection that includes a magnet.

* * * * *